(12) United States Patent
Sasao

(10) Patent No.: US 11,551,080 B2
(45) Date of Patent: Jan. 10, 2023

(54) LEARNING DATASET GENERATION METHOD, NEW LEARNING DATASET GENERATION DEVICE AND LEARNING METHOD USING GENERATED LEARNING DATASET

(71) Applicant: HITACHI KOKUSAI ELECTRIC INC., Tokyo (JP)

(72) Inventor: Hiroto Sasao, Tokyo (JP)

(73) Assignee: HITACHI KOKUSAI ELECTRIC INC., Tokyo (JP)

(*) Notice: Subject to any disclaimer, the term of this patent is extended or adjusted under 35 U.S.C. 154(b) by 553 days.

(21) Appl. No.: 16/618,183

(22) PCT Filed: May 30, 2017

(86) PCT No.: PCT/JP2017/020041
§ 371 (c)(1),
(2) Date: Nov. 29, 2019

(87) PCT Pub. No.: WO2018/220700
PCT Pub. Date: Dec. 6, 2018

(65) Prior Publication Data
US 2021/0158137 A1 May 27, 2021

(51) Int. Cl.
*G06G 7/00* (2006.01)
*G06N 3/08* (2006.01)
(Continued)

(52) U.S. Cl.
CPC .............. *G06N 3/08* (2013.01); *G06F 7/08* (2013.01); *G06N 3/04* (2013.01)

(58) Field of Classification Search
CPC . G06N 3/08; G06N 3/04; G06N 20/10; G06F 7/08; G06F 7/24
See application file for complete search history.

(56) References Cited

U.S. PATENT DOCUMENTS

2005/0261889 A1 11/2005 Iwakura
2008/0201281 A1* 8/2008 Graf .................... G06K 9/6269
706/12
(Continued)

FOREIGN PATENT DOCUMENTS

| JP | H10-326265 A | 12/1998 |
| JP | 2006-4399 A | 1/2006 |
| JP | 2015-95212 A | 5/2015 |

OTHER PUBLICATIONS

International Search Report dated Aug. 22, 2017.
(Continued)

*Primary Examiner* — Xin Jia
(74) *Attorney, Agent, or Firm* — Bacon & Thomas, PLLC (57) ABSTRACT

Even if an existing learning dataset is limited, a new learning dataset with sufficient variation is generated. Therefore, for each of a plurality of learning data subsets, new input signals are generated from input signals of a plurality of pieces of learning data, and a plurality of pieces of new learning data that are respectively combinations of the new input signals and output signals of the corresponding learning data subset are generated. The input signals of the plurality of pieces of the learning data included in the corresponding learning data subset are divided into a first signal group and a second signal group, and the new input signals are generated by a learning device that is generated by performing learning by the first signal group set as an input signal set and the second signal group set as an output signal set.

9 Claims, 9 Drawing Sheets

(51) Int. Cl.
*G06F 7/08* (2006.01)
*G06N 3/04* (2006.01)

(56) References Cited

U.S. PATENT DOCUMENTS

2012/0054131 A1* 3/2012 Williamson ............ G06N 20/00
706/12
2015/0134578 A1 5/2015 Tamatsu et al.

OTHER PUBLICATIONS

"Machine Learning Professional Series: Deep Learning," Takayuki Okaya, Kodansha Scientific, Apr. 2015, p. 35 (w/Machine Translation of relevant portions).
Aya Iwata et al., "Automatic Training Multi-Font Set Generation Method for Early-Modern Japanese Printed Character Recognition", IPSJ SIG Notes Mathematical Modeling and Problem Solving(MPS) 2015-MPS-105[online], Sep. 22, 2015(Sep. 22, 2015), pp. 1 to 6, ISSN:2188-8833(w/English abstract ).

* cited by examiner

LEARNING DATASET GENERATION METHOD, NEW LEARNING DATASET GENERATION DEVICE AND LEARNING METHOD USING GENERATED LEARNING DATASET

TECHNICAL FIELD

The present invention relates to a technique of generating a new learning dataset from an existing learning dataset used for machine learning.

BACKGROUND

Applying machine learning to the detection/identification/recognition/analysis/prediction of an image or a voice, language translation, marketing, strategy simulation, and the like is in progress. Since such functions are useful for reducing labor costs and improving profits and also can be incorporated into products to enhance functionality and promote product sales, many companies have great interest. There are two major methods of machine learning that realize these functions.

The first method is unsupervised learning. Unsupervised learning is performed by using only a set of input signals for a certain problem. It is often used to understand characteristics or structures from the input signals, and a representative method is a clustering method called k-means clustering. Accordingly, regularity can be found from a large amount of input signals, and an important causal relationship and the like can be found.

The second method is supervised learning. Supervised learning is performed by using a set of pairs of input signals for a certain problem and output signals expected as results of the input signals. On the contrary to unsupervised learning, a clear problem is set and how to solve the problem is learned. Finally, generalization performance for showing correct output signals even for unknown input signals is required, and generalization performance can be realized by using a neural network or the like.

In the case of unsupervised learning, each input signal is called learning data. In the case of supervised learning, a pair of each input signal and each output signal expected as a result of the corresponding input signal is called learning data, and a set of a plurality of pieces of learning data is called a learning dataset. Preparation of the learning dataset requires high costs, and particularly, in supervised learning, it is necessary to respectively link the input signals to the output signals. In many cases, the input signals and the output signals are manually linked to each other by using a dedicated tool corresponding to a problem to be solved.

Generally, in machine learning, the number and quality of a plurality of pieces of learning data included in a learning dataset determines the performance level of a function to be realized. Therefore, a large amount of various kinds of learning data is required, but as described above, in many cases, time and labor costs are high for preparing the learning dataset.

Non-Patent Document 1 introduces data augmentation as a method for increasing the amount of learning data. For example, in a case where an input signal is a still image, the data augmentation expands the learning dataset by performing inversion, rotation or brightness adjustment of the still image.

PRIOR ART

Non-Patent Document 1: "Machine Learning Professional Series: Deep Learning," Takayuki Okaya, Kodansha Scientific, April 2015, p. 35

Data augmentation can be used to expand the learning dataset by using the existing learning dataset. However, in the above example, there is a problem that while the view of an object changes, the object itself in the captured image does not change. Thus, the variation is not sufficient.

Meanwhile, attempts are being made to generate a new still image by machine learning. For example, an algorithm called deep convolutional generative adversarial network has been suggested. This algorithm includes a generator that receives a random signal and outputs a still image, and a discriminator that discriminates between learning data and an output signal of the generator. First, when the learning data is input, the discriminator is trained to output '0,' and then the output signal of the generator is input to the trained discriminator. Then, by simultaneously training the discriminator such that the output signal of the discriminator becomes "1" and training the generator such that the output signal of the discriminator becomes "0," it is possible to generate a new still image similar to the still image that is the learning data. In this method, since the input signal input to the generator is a random signal, it takes time to converge. Further, it is premised that the learning dataset already has a plurality of pieces of learning data with sufficiently high quality and quantity. That is, in a case where the quality and quantity of existing learning data are limited, generation of appropriate learning data is not guaranteed.

For this reason, in order to make it easier to apply machine learning with supervised learning, it is desirable to be able to generate a new learning dataset with sufficient variation by using the existing learning dataset even if an existing learning dataset is limited.

SUMMARY

In accordance with an aspect of the present disclosure, there is provided a new learning dataset generation method including: sorting a learning dataset that includes a plurality of pieces of learning data that are respectively combinations of input signals and output signals into a plurality of learning data subsets depending on the output signals; for each of the plurality of learning data subsets, generating new input signals from the input signals of a plurality of pieces of learning data included in the corresponding learning data subset and integrating a plurality of pieces of new learning data, which are respectively combinations of the new input signals and output signals of the corresponding learning data subset, and the plurality of pieces of learning data included in the corresponding learning data subset, to thereby generate a new learning data subset; generating a new learning dataset by integrating the new learning data subsets generated for the plurality of learning data subsets; and when the new input signals are generated from the input signals of the plurality of pieces of learning data included in each of the plurality of learning data subsets, dividing the input signals of the plurality of pieces of learning data included in the corresponding learning data subset into a first signal group and a second signal group, and generating the new input signals by a first learning device that is generated by performing learning with the first signal group set as an input signal set and the second signal group set as an output signal set.

EFFECT

A new learning dataset can be generated from an existing limited learning dataset at low cost.

DETAILED DESCRIPTION

An outline of a learning dataset generation method of the present embodiment will be described with reference to FIG. 1. A two-class classification problem that classifies images of a cat and a dog using supervised learning is taken as an example. A new learning dataset is generated based on an existing learning dataset for solving this problem.

First, a learning dataset 102 that is a set of a plurality of pieces of learning data 101 is prepared, in each of which an image of the cat or an image of the dog is correctly linked to an output signal thereof that is "cat" or "dog." Next, the prepared learning dataset 102 is sorted into a cat learning dataset 103 that is a set (subset) of a plurality of pieces of learning data each having the output signal "cat" and a dog learning dataset 104 that is a set (subset) of a plurality of pieces of learning data each having the output signal "dog." From the sorted cat learning dataset 103 and the dog learning dataset 104, new learning datasets, which are a new cat learning dataset 105 and a new dog learning dataset 106, are independently generated. The new cat learning dataset 105 includes the cat learning dataset 103, and the new dog learning dataset 106 includes the dog learning dataset 104. Eventually, a new learning dataset 107 is generated by integrating the new cat learning dataset 105 and the new dog learning dataset 106.

Figure 2:
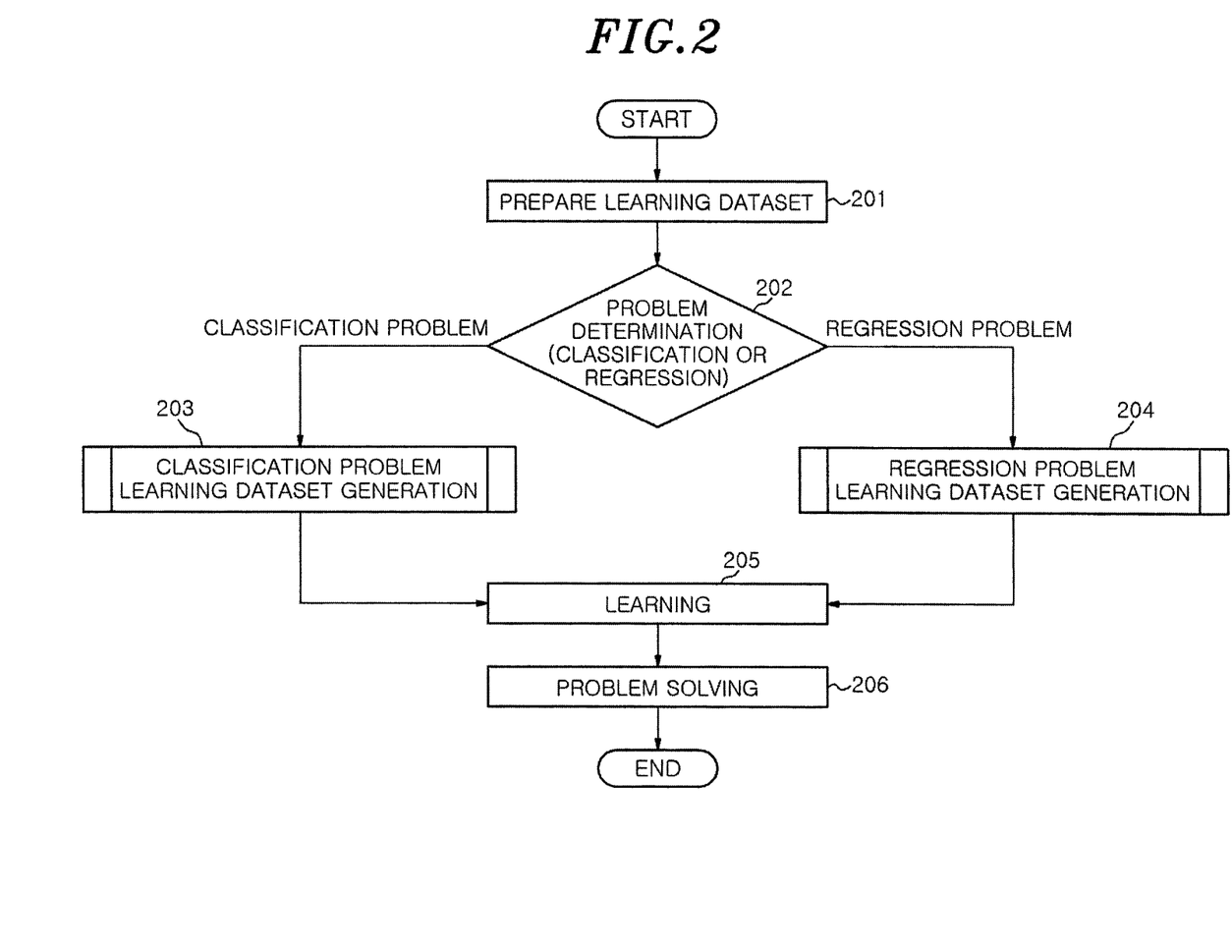
FIG. 2 is a flowchart for performing problem solving by a learning device that executes supervised machine learning.

FIG. 2 is a flowchart for performing problem solving by a learning device that executes supervised machine learning. A new learning dataset is generated from the existing learning dataset, and the supervised machine learning is executed by using the generated new learning dataset. Details of a learning dataset preparation step 201, a problem determination step 202, a classification problem learning dataset generation step 203, a regression problem learning dataset generation step 204, a learning step 205, and a problem solving step 206 will be described.

In the learning dataset preparation step 201, a learning dataset for a problem to be solved by using the supervised machine learning is prepared. The problem to be solved includes, for example, detection, identification, analysis, prediction and estimation of an input signal, language translation, marketing, strategy simulation, and the like in addition to recognition of the input signal illustrated in FIG. 1. The prepared learning dataset corresponds to the learning dataset 102 shown in FIG. 1. The input signal and the output signal are not particularly limited as long as the input signal and the output signal are electrical signals and may be sound, voice, radio waves, an image, video, text data and the like. The existing learning dataset can be used as the learning dataset 102, and is acceptable even when there may not be a sufficient amount of learning data for problem solving.

Further, the learning dataset may be generated by using a dedicated tool (such as an automatic generation tool or an auxiliary tool). However, it is necessary to align the sizes of the input signals and the output signals of the learning dataset 102 depending on the learning device used for problem solving. Therefore, interpolation, reduction or the like due to conversion of the size is performed if necessary. Here, the size of the input signal and the size of the output signal refers to the number of pixels or the number of frames when the signals are image data or video data; the number of samples of time-series data, the number of frequency bins of a frequency spectrum, or the like when the signals are data such as sound, voice or radio waves; and the number of characters, words, sentences, or the like when the signals are text data.

In the problem determination step 202, the type of problem to be solved is determined by using the learning dataset prepared in the learning dataset preparation step 201. The problem is divided into a classification problem type and a regression problem type. A classification problem determines which class the input data belongs to. For example, in addition to classification of the image as illustrated in FIG. 1, recognition and identification of the image/video/sound/voice/text and the like, and language translation and the like also correspond thereto. A regression problem estimates a certain numeral value from the input data. For example, the super-resolution of an image/video/sound/voice and the like, size estimation of a target object from the image or the video or an estimation of a distance to the target object, estimation of the age of a speaker or estimation of a distance to the speaker from the voice, and the like correspond thereto. This determination is performed by a human.

When the determined problem type is a classification problem, the classification problem learning dataset generation step 203 is executed. When the determined problem type is a regression problem, the regression problem learning dataset generation step 204 is executed.

Figure 1:
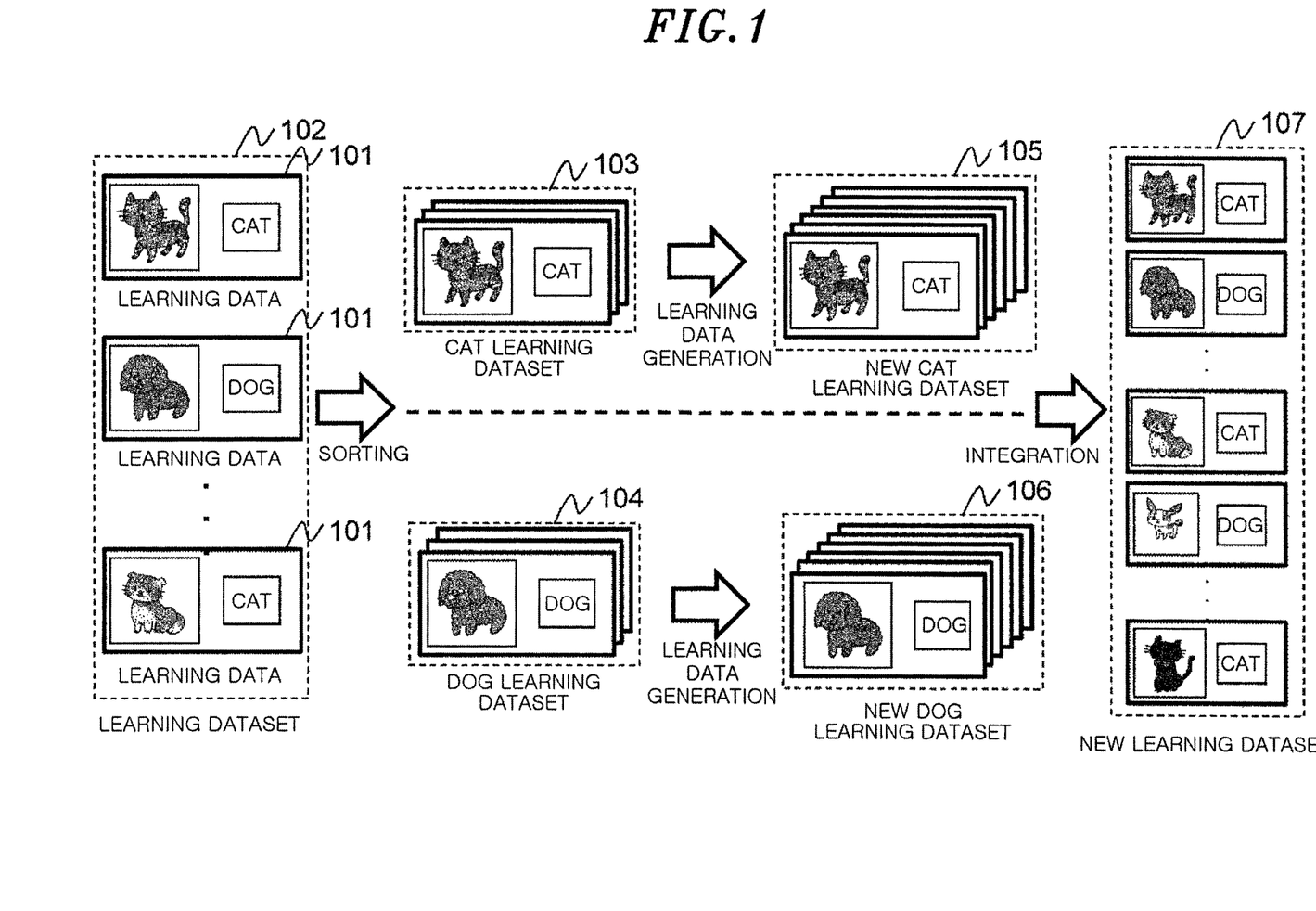
FIG. 1 shows an outline of a learning dataset generation method.

The classification problem learning dataset generation step 203 and the regression problem learning dataset generation step 204 respectively correspond to the entire process of FIG. 1 and, in steps 203 and 204, the new learning dataset is generated based on the learning dataset prepared in the learning dataset preparation step 201. Details thereof will be described later.

In the learning step 205, machine learning for problem solving is performed by using the new learning dataset generated in the classification problem learning dataset generation step 203 or the regression problem learning dataset generation step 204, thereby generating a learning device (learner) or performing a parameter adjustment of the learning device. A learning method is supervised learning such as a simple perceptron or a logistic regression, a neural network or a support vector machine (SVM), decision tree learning, a Bayesian network, and a random forest. A hyperparameter or an optimization of each method may be arbitrarily determined.

In the problem solving step 206, the learning device generated in the learning step 205 is used for problem solving. Problem solving refers to an analysis of human emotion from the image or video or an estimation of a gender/age/height/weight and the like; detection of a specific object such as an intruder or a suspicious object or a detection of a specific behavior such as running or squatting; identification/recognition/counting of a specific object such as a person or a license plate; understanding of a situation such as congestion; estimation of a human being or an age from the sound or the voice; translation; textualization; estimation of a propagation direction of the sound or the voice; understanding of a meaning; understanding, translating and writing the content of text; and the like, and further refers to a problem to be solved by other supervised learning.

Figure 3:
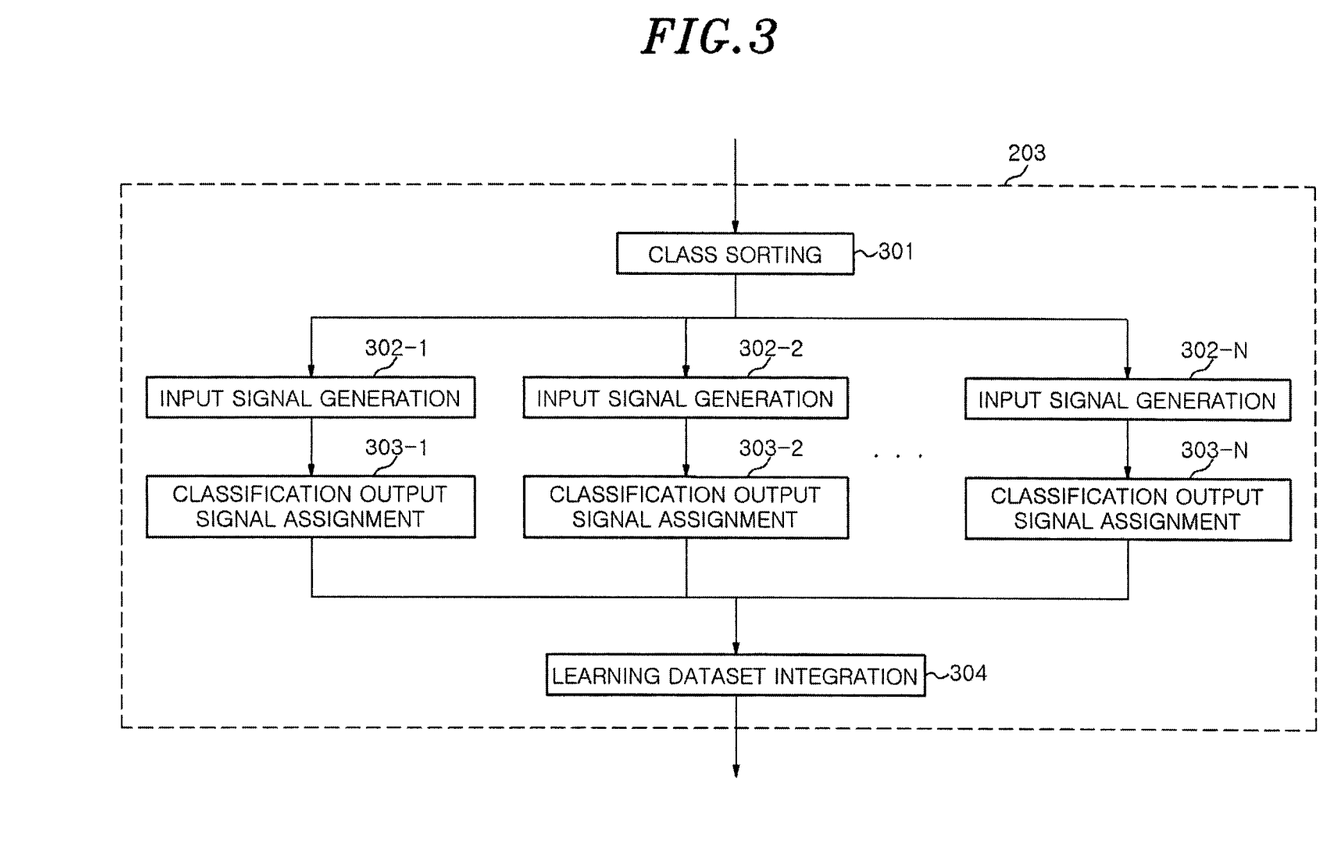
FIG. 3 is a flowchart for generating a classification problem learning dataset.

FIG. 3 is a flowchart for generating the classification problem learning dataset. First, in a class sorting step 301, the learning dataset prepared in the learning dataset preparation step 201 is sorted into N number of class learning datasets (learning data subsets). N is the number of classifications (number of classes) of a classification problem, and each class learning dataset includes a plurality of pieces of learning data having the same output signal. FIG. 1 shows an example of N=2, and each of the cat learning dataset 103 and the dog learning dataset 104 corresponds to a class learning dataset. The amount of learning data included in each class learning dataset may be different between the class learning datasets.

Figure 4:
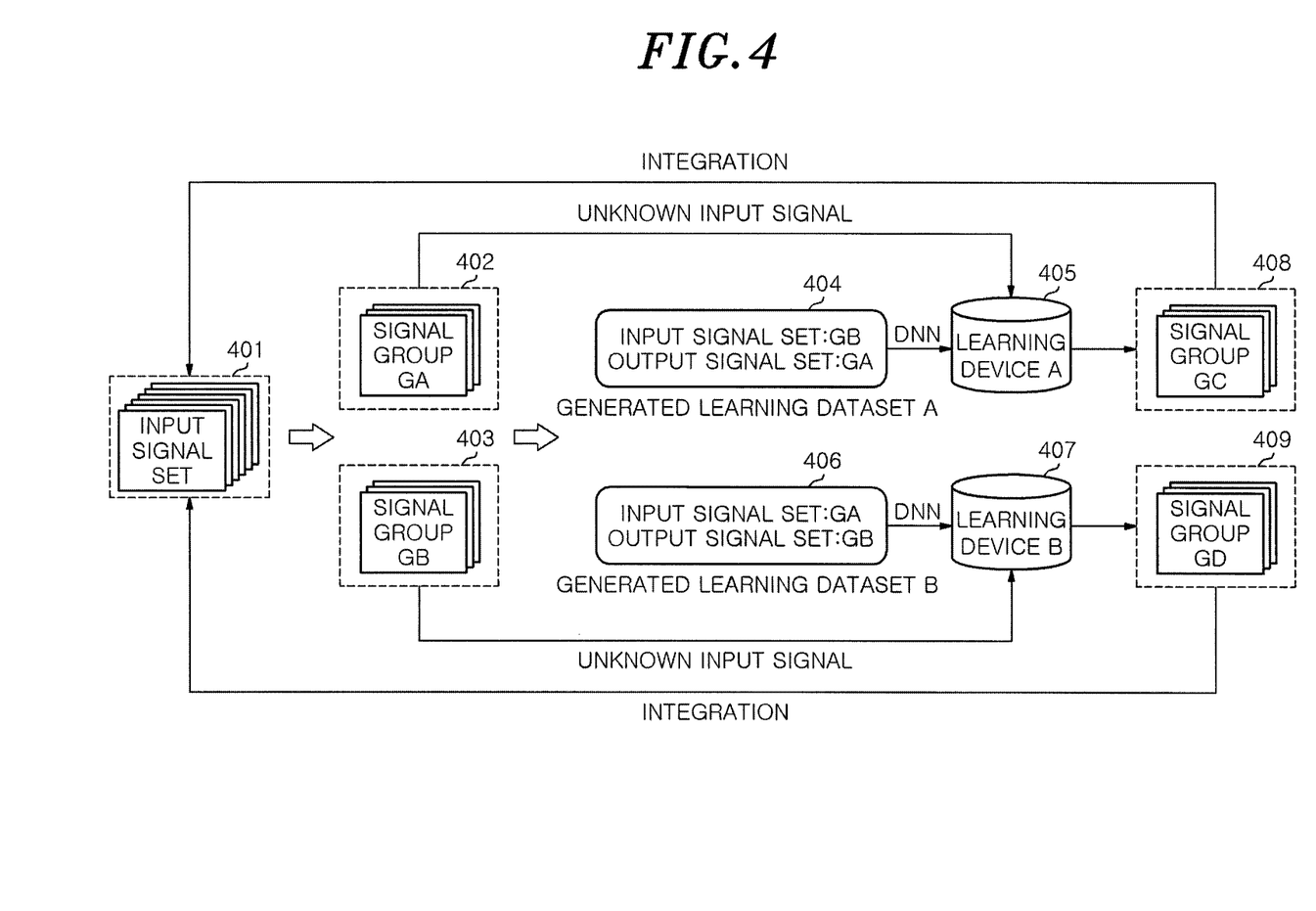
FIG. 4 shows an outline of an input signal generation method.

FIG. 4 shows an outline of an input signal generation method of the input signal generation step 302. In the input signal generation step 302, an input signal set (set of input signals) 401 of each class learning dataset sorted in the class assignment step 301 is extracted. In the example of FIG. 1, the input signal set corresponds to the set of cat images in the case of the cat learning dataset 103 or the set of dog images in the case of the dog learning dataset 104. The extracted input signal set 401 is randomly divided into two equal parts, and the divided two parts are set as a signal group GA 402 and a signal group GB 403. Next, the signal group GB 403 is set as an input signal set and the signal group GA 402 is set as an output signal set (set of output signals). Then, the input signal set and the output signal set are randomly linked in a one-to-one relationship, thereby generating a learning dataset A 404. Learning is performed as a deep neural network (DNN) regression problem based on the generated learning dataset A404, thereby generating a learning device A 405. Similarly, the signal group GA 402 is set as an input signal set and the signal group GB 403 is set as an output signal set. Then, the input signal set and the output signal set are randomly linked in a one-to-one relationship, thereby generating a learning dataset B406. Learning is performed as a DNN regression problem based on the generated learning dataset B406, thereby generating a learning device B 407.

Figure 6:
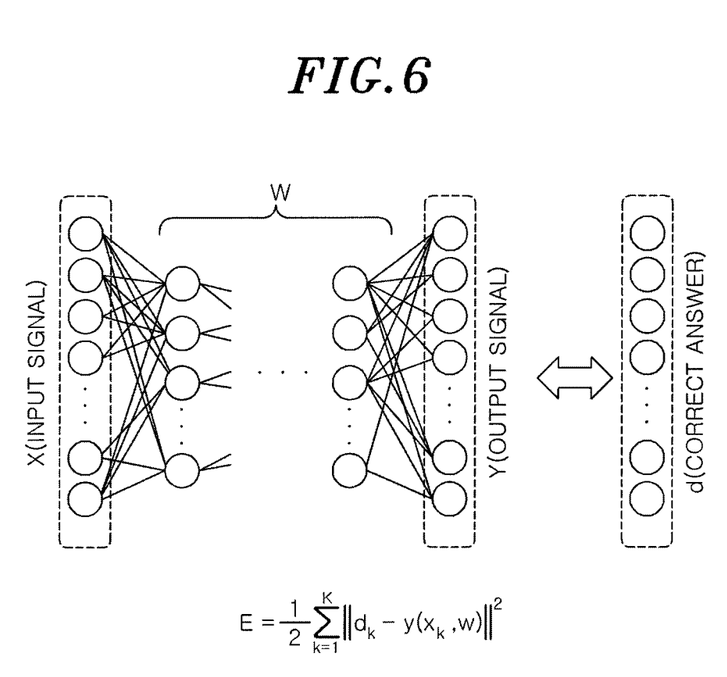
FIG. 6 shows a learning device generation method.

As illustrated in FIG. 6, when an output at the time of inputting x (a signal (image in the example of FIG. 1) belonging to the signal group GA 402 or a signal belonging to the signal group GB 403) to a neural network having the parameter w is set as y(x,w) and a correct answer is set as d (a signal belonging to the signal group GB 403 or a signal belonging to the signal group GA 402 that is randomly linked in a one-to-one relationship), the DNN learns the parameter w that minimizes an objective function E indicating a distance between the output and the correct answer. Here, K is the total number of samples (the number of data of the signal group GA 402 or the signal group GB 403).

Further, in order to randomly connect the input signal set and the output signal set in the generated learning dataset 404 (406) in a one-to-one relationship, the input signal set 401 is randomly divided into two equal parts. However, in a case where the number of signals included in the input signal set 401 is an odd number, one signal is excluded and the subsequent processing is performed, and the excluded signal may be included in a new learning dataset.

Alternatively, the input signal set 401 may be divided into one part having an odd number of signals and one part having an even number of signals. In this case, the number of signals in the input signal set is different from the number of signals in the output signal set in the generated learning dataset 404 (406). Thus, a case where two correct answers for one input signal or one correct answer for two input signals may occur, but there is little influence on DNN learning convergence.

The depth/width of a DNN network layer, the structure of an activation function or the like, a minimization algorithm, and the like may be arbitrarily designed. For example, an algorithm called Generative Adversarial Learning may be used, or a kernel method or a SVM other than DNN may be used. Further, a network structure or a learning method of the DNN that generates the learning device A 405 may not be the same as a network structure or a learning method of the DNN that generates the learning device B 407.

Next, the signal group GA 402 is given to the generated learning device A 405 as unknown input signals to obtain a signal group GC 408. Similarly, the signal group GB 403 is given to the generated learning device B 407 as unknown input signals to obtain a signal group GD 409. Finally, the signal group GC 408 and the signal group GD 409 are integrated into the input signal set 401 to obtain a new input signal set 401. When integrating, there is no limit on the order of the input signals and any order may be used. Alternatively, when integrating, distinguishing between the existing input signal set 401 and the newly generated signal groups GC 408 and GD 409 may be stored as an attribute. A process from the division of the input signal set 401 into two equal parts to the obtaining of the new input signal set 401 by integrating the signal group GC 408 and the signal group GD 409 into the input signal set 401 may be repeated until the number of required input signals is obtained.

In the above description, the input signal set 401 is divided into two equal parts to generate new signal groups, but the signal group generation method is not limited thereto. For example, the input signal set 401 may be divided into three equal parts, two signal groups may be used for the learning in the same manner as in the example of FIG. 4, and the remaining one signal group may be given to the learning device A 405 and the learning device B 407 as unknown input signals. Further, only one of the learning device A 405 and the learning device B 407 may be generated. However, in view of obtaining more variation from the same learning dataset, it is desirable that the learning is performed by switching the input and output signal groups as illustrated in FIG. 4.

After the new input signal set is generated (step 302), in a classification output signal assignment step 303, the output signal is linked to each of input signals (signal groups GC 408 and GD 409) to which the output signal is not linked in the new input signal set generated in input signal generation step 302, thereby generating a new class learning dataset. Since the input signals GC 408 and GD 409 are all generated from the input signal set of the same class, the output signals linked to the input signals in the new class learning dataset are the same as the output signals of each class learning dataset sorted in the class sorting step 301.

In a learning dataset integration step 304, the new class learning datasets generated in the respective classification output signal assignment steps 303-1 to 303-N are integrated as one learning dataset. The integrated learning dataset corresponds to the new learning dataset 107 shown in FIG.

1. When integrating, there is no limit on the order of the input signals and any order may be used. Further, in the case where the attribute for distinguishing between the existing input signal set and the newly generated signal group is given when the new input signal set is generated, the attribute information is also derived.

Figure 5:
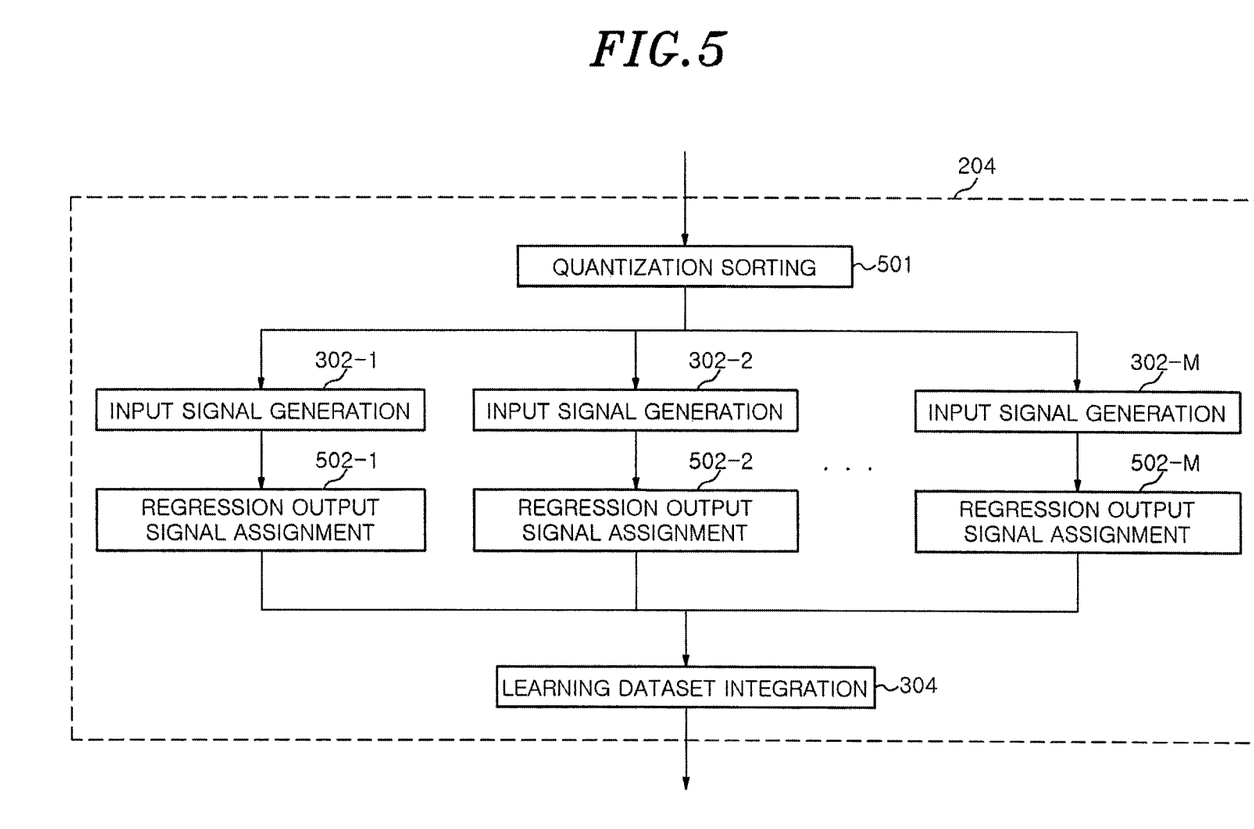
FIG. 5 is a flowchart for generating a regression problem learning dataset.

FIG. 5 is a flowchart for generating the regression problem learning dataset. First, in a quantization sorting step 501, the learning dataset prepared in the learning dataset preparation step 201 is sorted into M number of quantum learning datasets. Specifically, output signals of the learning dataset are quantized and the learning dataset is sorted into M number of quantum learning datasets, each including a plurality of pieces of learning data having the same quantization value.

Here, M is a quantization number, and the quantization number M can be determined based on a problem to be solved and a variation (statistical information such as a maximum value, a minimum value, an average, a variance, and a distribution) of the learning dataset prepared in the learning dataset preparation step 201. As an example, in a case of a learning dataset in which a face image is set as an input signal and the age of a target object is set as an output signal, quantization is performed by appropriately classifying the ages. For example, learning data having output signals of 11 to 15 years old is set as one quantum learning dataset, and learning data having output signals of 16 to 20 years old is set as another quantum learning dataset.

In the input signal generation step 302, new input signal sets are generated independently and respectively by using the input signal set extracted from each quantum learning dataset sorted in the quantization sorting step 501 as described with reference to FIG. 4.

In a regression output signal assignment step 502, the output signal is linked to each input signal (signal groups GC 408 and GD 409) to which the output signal is not linked in the new input signal set generated in the input signal generation step 302, thereby generating a new quantum learning dataset. The output signals linked to the input signals in the new quantum learning dataset are a representative value of the output signals of each class learning dataset sorted in the quantization sorting step 501. Here, the representative value of the output signal may include an average value, a maximum value, a minimum value, a most frequent value, a median value, and the like. Further, it is not necessary for a common value of the output signal to be linked to the new input signals, and the average value, the maximum value, the minimum value, the most frequent value, the median value, or the like of the output signal may be set for each quantum learning dataset.

In the learning dataset integration step 304, the new quantum learning datasets generated in the respective regression output signal assignment steps 502-1 to 502-M are integrated as one learning dataset in the same manner as described in FIG. 3. When integrating, there is no limit on the order of the input signals and any order may be used. Further, in the case where the attribute for distinguishing between the existing input signal set and the newly generated signal group is added when the new input signal set is generated, the attribute information is also derived.

Figure 7:
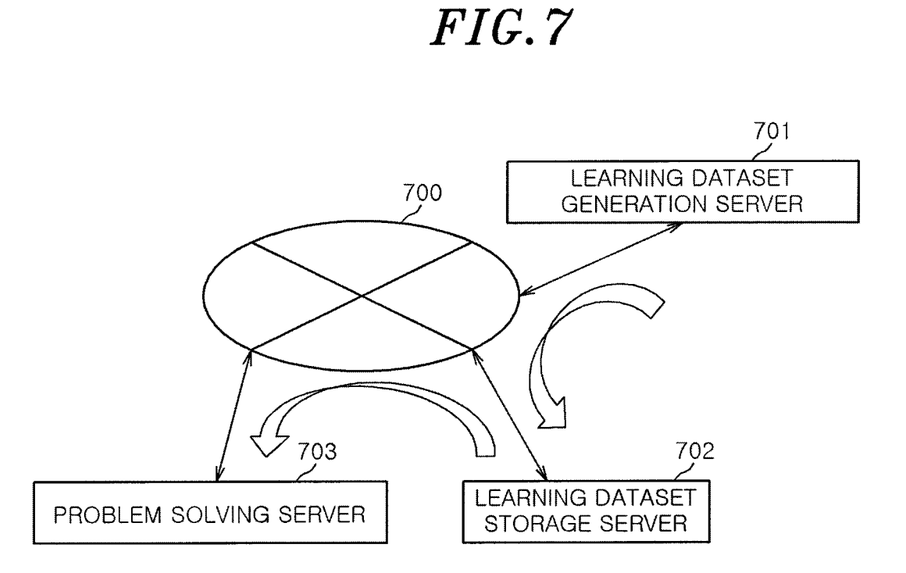
FIG. 7 shows a hardware configuration of the present embodiment.

A hardware configuration that realizes the present embodiment will be described with reference to FIG. 7. A learning dataset generation device (here, a server) 701, a learning dataset storage device (here, a server) 702, and a problem solving device (here, a server) 703 are connected by a network 700. The network 700 is a circuit capable of data communication connecting the respective servers. There is no limit on the type of line and may be, e.g., a dedicated line, an intranet, and an IP network such as the Internet.

The learning dataset generation server 701 performs steps 201 to 204 in the flowchart of FIG. 2 and stores the generated learning dataset in the learning dataset storage server 702. The problem solving server 703 accesses the learning dataset storage server 702 and performs steps 205 to 206 in the flowchart of FIG. 2. That is, the problem solving is carried out by a learning device that performed learning by using the learning dataset generated by the learning dataset generation server 701. The hardware configuration shown in FIG. 7 is merely an example, and various modifications can be made. For example, the flowchart of FIG. 2 can be realized by one server, and the learning dataset generated from the learning dataset generation server 701 can be directly provided to the problem solving server 703.

Figure 8:
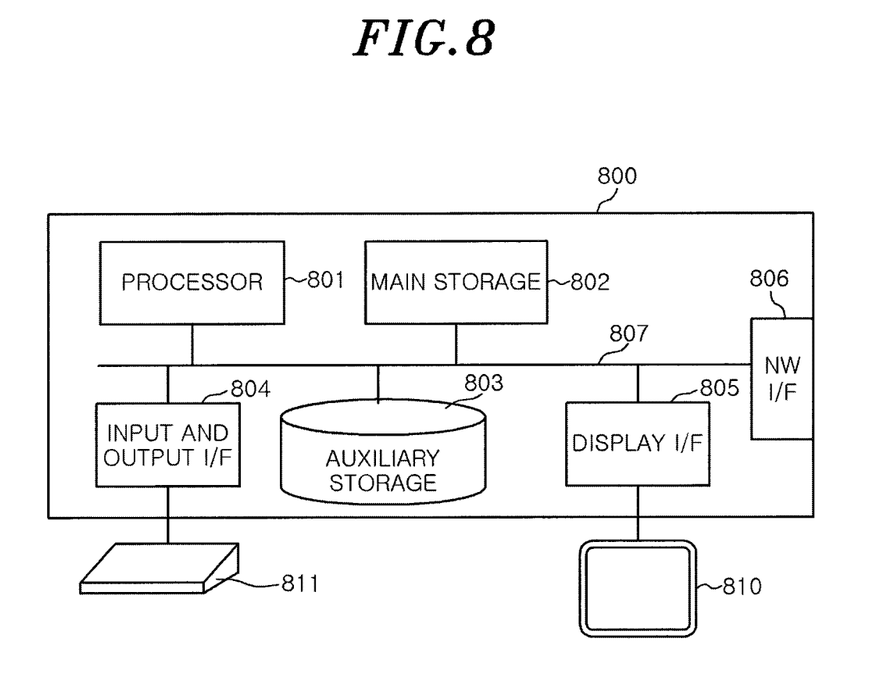
FIG. 8 shows a hardware configuration example of a server.

FIG. 8 illustrates an example of the hardware configuration of the servers 701 to 703. A server 800 includes a processor 801, a main storage 802, an auxiliary storage 803, an input and output interface (I/F) 804, a display interface (I/F) 805, and a network interface (NW I/F) 806, which are connected by a bus 807. The input and output interface 804 is linked to an input device 811 such as a keyboard and a mouse to provide a user interface. The display interface 805 is connected to a display 810. The network interface 806 is an interface for connecting the server 800 to the network 700.

The auxiliary storage 803 is usually configured by a nonvolatile memory such as an HDD or flash memory and stores a program executed by the server 800, data that is a processing target of the program, and the like. The main storage 802 is configured by RAM and temporarily stores a program, data necessary for executing the program, and the like in response to a command from the processor 801. The processor 801 executes the program loaded from the auxiliary storage 803 to the main storage 802.

Figure 9:
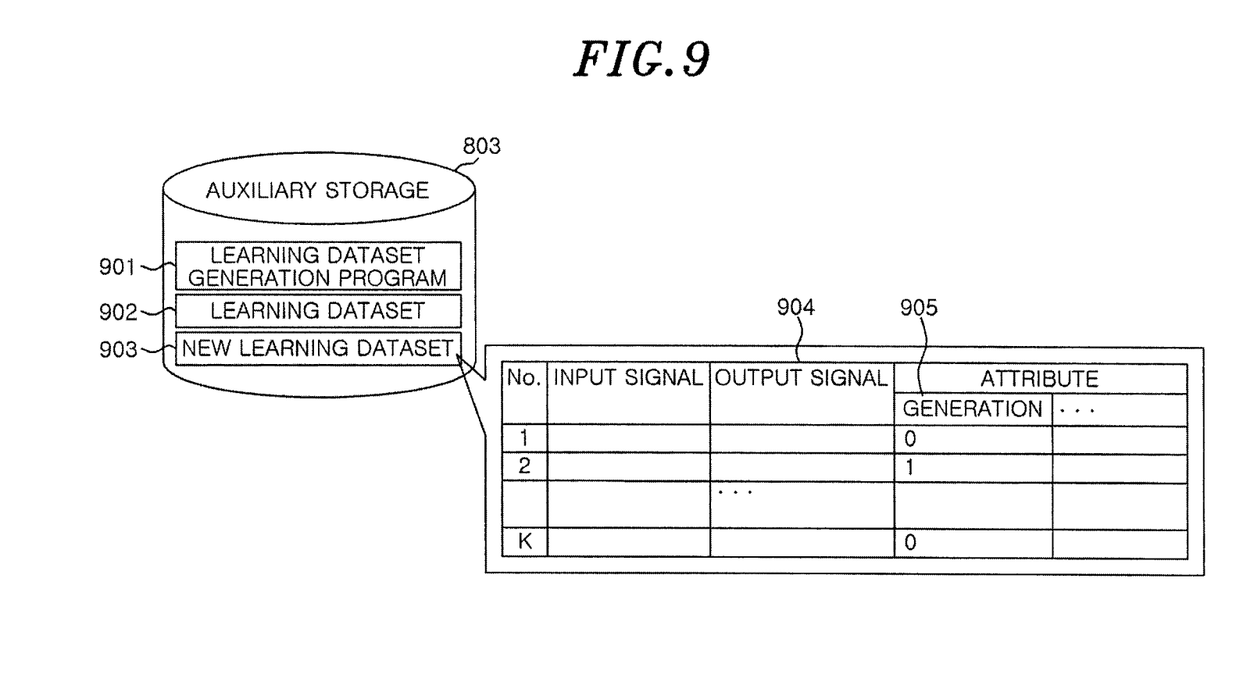
FIG. 9 shows a program and data stored in an auxiliary storage of a learning dataset generation server.

FIG. 9 shows programs and data stored in the learning dataset generation server 701. A learning dataset generation program 901 is stored as a program, and the flowchart of FIG. 3 or FIG. 5 is executed by the program. That is, in order to generate a new learning dataset 903, a learning dataset 902 is read into the main storage 802, and sizes of the input signals and the output signals are adjusted as necessary. Input of the type of problem from the user is received from the input device 811, and a learning dataset is generated depending on the type of problem. The generated new learning dataset 903 is stored, for example, in the form of a table 904. In the table 904, data itself may be stored as an input signal or an output signal, or an address indicating a data storage position may be stored. Further, a column 905 indicating whether or not the data is generated may be provided as an attribute, and a flag indicating whether or not the data is generated according to the present embodiment may be stored. Further, the learning dataset 902 may be overwritten by the generated new learning dataset 903.

Figure 10:
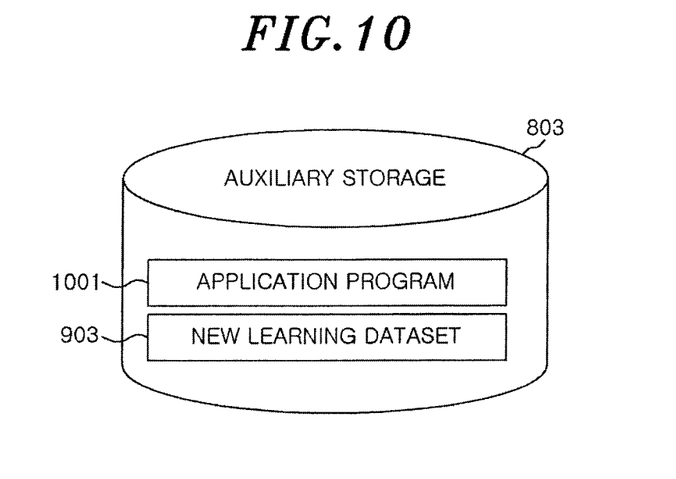
FIG. 10 shows a program and data stored in an auxiliary storage of a problem solving server.

FIG. 10 shows programs and data stored in the problem solving server 703. A specific application program 1001 corresponding to a problem to be solved is stored as a program, and the program performs steps 205 to 206 in FIG. 2. That is, the new learning dataset 903 is read into the main storage 802 and learning is performed. In a case where a parameter of the learning device is adjusted, a learning order may be determined based on whether or not the learning data included in the new learning dataset 903 is the generated data. For example, after the learning is performed with original learning data, the learning may be performed with the generated data, or conversely, the learning may begin with the generated data and then performed with the original learning data. By the above learning, a learning device of the application program 1001 is generated, and the problem can be solved by the learning device that generated an unknown input signal.

As described above, by using a new learning dataset generation method of supervised learning, it is possible to automatically generate a large number of variation-rich learning datasets, greatly reduce labor costs and generate a learning device with high generalization performance by using learning data thereof.

EXPLANATION OF REFERENCE NUMERALS

101: learning data
102: learning dataset
103, 104: class learning dataset
105, 106: new class learning dataset
107: new learning dataset

What is claimed is:

1. A new learning dataset generation method comprising:
sorting a learning dataset, including a plurality of pieces of learning data that are respectively combinations of input signals and output signals, into a plurality of learning data subsets depending on the output signals;
for each of the plurality of learning data subsets, generating new input signals from the input signals of a plurality of pieces of learning data included in the corresponding learning data subset and integrating a plurality of pieces of new learning data, which are respectively combinations of the new input signals and output signals of the corresponding learning data subset, and the plurality of pieces of learning data included in the corresponding learning data subset, thereby generating a new learning data subset; and
generating a new learning dataset by integrating the new learning data subsets generated for the plurality of learning data subsets,
wherein, when the new input signals are generated from the input signals of the plurality of pieces of learning data included in each of the plurality of learning data subsets, the input signals of the plurality of pieces of learning data included in the corresponding learning data subset are divided into a first signal group and a second signal group, and the new input signals are generated by generating a first learning device that is generated by performing learning with the first signal group set as an input signal set and the second signal group set as an output signal set, and by inputting input signals of the second signal group to the first learning device.

2. The new learning dataset generation method of claim 1, wherein, when the new input signals are generated from the input signals of the plurality of pieces of learning data included in each of the plurality of learning data subsets, the new input signals are generated by generating a second learning device that is generated by performing learning with the second signal group set as an input signal set and the first signal group set as an output signal set and by inputting input signals of the first signal group to the second learning device.

3. The new learning dataset generation method of claim 1, wherein, when the learning dataset relates to a classification problem, the learning dataset is sorted into the plurality of learning data subsets depending on classes of the classification problem, and the output signals of the plurality of pieces of new learning data in each of the plurality of learning data subsets correspond to the class of the corresponding learning data subset.

4. The new learning dataset generation method of claim 1, wherein, when the learning dataset relates to a regression problem, the output signals of the learning dataset are quantized and the learning dataset is sorted into the plurality of learning data subsets depending on quantization values of the learning dataset, and the output signals of the plurality of pieces of new learning data in each of the plurality of learning data subsets are a representative value of the output signals of the plurality of pieces of learning data included in the corresponding learning data subset.

5. The new learning dataset generation method of claim 1, wherein, when the new input signals are generated from the input signals of the plurality of pieces of learning data included in each of the plurality of learning data subsets, a plurality of pieces of learning data included in the first signal group are randomly linked to a plurality of pieces of learning data included in the second signal group in a one-to-one relationship, and learning is performed as a regression problem of a neural network, thereby generating the first learning device.

6. The new learning dataset generation method of claim 1, wherein an attribute for distinguishing the plurality of pieces of learning data included in each of the plurality of the learning data subsets is given to the plurality of pieces of new learning data.

7. A new learning dataset generation device comprising:
a processor;
a main storage; and
a learning dataset generation program that is read into the main storage and executed by the processor,
wherein the learning dataset generation program includes a sorting unit configured to sort a learning dataset into a plurality of learning data subsets, an input signal generation unit configured to generate new input signals for each of the plurality of learning data subsets sorted by the sorting unit, and an output signal assignment unit configured to assign output signals to the new input signals,
wherein the input signal generation unit generates the new input signals by dividing input signals of a plurality of pieces of learning data included in each of the plurality of the learning data subsets into a first signal group and a second signal group, by generating a first learning device that is generated by performing learning with the first signal group set as an input signal set and the second signal group set as an output signal set, and by inputting input signals of the second signal group to the first learning device, and
wherein the output signal assignment unit assigns the output signals corresponding to each of the plurality of the learning data subsets to the new input signals.

8. The new learning dataset generation device of claim 7, wherein the input signal generation unit generates the first learning device by randomly linking a plurality of pieces of learning data included in the first signal group to a plurality of pieces of learning data included in the second signal group in a one-to-one relationship, and performing learning as a regression problem of a neural network.

9. The new learning dataset generation device of claim 7, wherein the input signal generation unit generates the new input signals by generating a second learning device that is generated by performing learning with the second signal group set as an input signal set and the first signal group set as an output signal set, and by inputting input signals of the first signal group to the second learning device.

* * * * *